(12) United States Patent
Maureira Carsalade

(10) Patent No.: US 11,421,435 B2
(45) Date of Patent: Aug. 23, 2022

(54) KINEMATIC SEISMIC ISOLATION DEVICE

(71) Applicant: UNIVERSIDAD CATOLICA DE LA SANTISIMA CONCEPCION, Concepcion (CL)

(72) Inventor: Nelson Eduardo Maureira Carsalade, Concepcion (CL)

(73) Assignee: UNIVERSIDAD CATOLICA DE LA SANTISIMA CONCEPCION, Concepcion (CL)

( * ) Notice: Subject to any disclaimer, the term of this patent is extended or adjusted under 35 U.S.C. 154(b) by 0 days.

(21) Appl. No.: 17/312,287

(22) PCT Filed: Dec. 12, 2018

(86) PCT No.: PCT/IB2018/059935
§ 371 (c)(1),
(2) Date: Jun. 16, 2021

(87) PCT Pub. No.: WO2020/121029
PCT Pub. Date: Jun. 18, 2020

(65) Prior Publication Data
US 2022/0106804 A1    Apr. 7, 2022

(51) Int. Cl.
*E04H 9/02* (2006.01)
*E04H 9/00* (2006.01)
(Continued)

(52) U.S. Cl.
CPC .............. *E04H 9/021* (2013.01); *E04H 9/023* (2013.01); *E04H 9/0235* (2020.05); *F16F 15/02* (2013.01);
(Continued)

(58) Field of Classification Search
CPC .......... F16F 15/00; F16F 15/02; F16F 15/022; F16F 15/04; F16F 15/10; F16F 15/12;
(Continued)

(56) References Cited

U.S. PATENT DOCUMENTS 3,762,114 A * 10/1973 Eskijian ................. E04H 9/023
52/167.4
3,771,270 A * 11/1973 Byers ...................... E04H 9/023
52/167.6
(Continued)

FOREIGN PATENT DOCUMENTS

CA      2777088 A1 *  1/2011   ............... E04B 1/98
CL   2006001953 B1    1/2007
(Continued)

OTHER PUBLICATIONS

International Search Report for Corresponding International Application No. PCT/IB2018/059935 dated Jun. 10, 2019 and English translation.

*Primary Examiner* — Phi D A
(74) *Attorney, Agent, or Firm* — Lucas & Mercanti, LLP

(57) ABSTRACT

A kinematic seismic isolation device for isolating a superstructure from the movement experienced by a substructure or foundation by providing lateral stability and resistance to stress having a rigid-structure helmet piece with the convex part facing upward and a radius of curvature R; and an intermediate rigid-structure body coupled to the underside of the helmet piece and extends to a bottom end of the device connected by a pivoting connection to the substructure or foundation, wherein the radius of curvature R is greater than or equal to the height H of the device; and wherein a tread plate, which is secured to the bottom surface of the superstructure, rests on the helmet piece.

15 Claims, 10 Drawing Sheets

(51) Int. Cl.
*F16F 15/02* (2006.01)
*F16F 15/12* (2006.01)

(52) U.S. Cl.
CPC ......... *F16F 15/022* (2013.01); *F16F 15/1204* (2013.01)

(58) Field of Classification Search
CPC ..... F16F 15/1204; F16F 15/1208; E04H 9/00; E04H 9/021; E04H 9/023; E04H 9/0235
See application file for complete search history.

(56) References Cited

U.S. PATENT DOCUMENTS

| | | | |
|---|---|---|---|
| 4,496,130 A | 1/1985 | Toyama | |
| 4,581,199 A * | 4/1986 | Bioret | E04H 9/021 376/293 |
| 4,644,714 A * | 2/1987 | Zayas | E04H 9/021 248/562 |
| 4,726,161 A * | 2/1988 | Yaghoubian | E04H 9/023 52/167.6 |
| 4,766,708 A * | 8/1988 | Sing | E04B 1/98 52/167.2 |
| 5,942,735 A | 8/1999 | Liang | |
| 6,085,471 A * | 7/2000 | Axon | E01D 19/02 52/167.7 |
| 11,193,295 B1 * | 12/2021 | Proctor | E04H 9/0237 |
| 2004/0221520 A1 * | 11/2004 | Chiang | E04H 9/0235 52/167.4 |
| 2006/0260222 A1 | 11/2006 | Lee | |
| 2008/0098671 A1 * | 5/2008 | Tsai | E04H 9/023 52/167.6 |
| 2008/0184634 A1 * | 8/2008 | Tomoyasu | E04H 9/023 52/167.5 |
| 2012/0047822 A1 * | 3/2012 | Zeevi | E04H 9/021 52/167.4 |
| 2012/0174500 A1 * | 7/2012 | Yakoub | E04B 1/98 52/167.6 |
| 2014/0291475 A1 * | 10/2014 | Hubbard | E04B 1/98 248/580 |
| 2015/0048234 A1 * | 2/2015 | Almazan Campillay | E04H 9/021 248/568 |
| 2015/0101269 A1 * | 4/2015 | Moreno | F16F 15/021 52/167.5 |
| 2017/0108034 A1 * | 4/2017 | McGuire | F16C 11/0604 |
| 2017/0342734 A1 | 11/2017 | Shimoda et al. | |
| 2020/0318373 A1 * | 10/2020 | Almazán Campillay | F16F 1/3732 |
| 2021/0140188 A1 * | 5/2021 | Kim | E04B 1/36 |
| 2021/0310266 A1 * | 10/2021 | Lu | E04H 9/021 |
| 2022/0055777 A1 * | 2/2022 | West | E04H 6/44 |

FOREIGN PATENT DOCUMENTS

| | | | |
|---|---|---|---|
| CN | 104763056 A | 7/2015 | |
| DE | 10353907 A1 * | 6/2005 | ............ E04H 9/023 |
| DE | 102013104064 A1 * | 10/2014 | ......... E01D 19/046 |
| DE | 102018218999 A1 * | 5/2020 | .............. E04B 1/98 |
| EP | 2899334 A1 * | 7/2015 | ............ E04H 9/023 |
| EP | 3604678 A1 * | 2/2020 | ............ B64F 1/305 |
| FR | 2738861 A1 | 3/1997 | |
| JP | 2008057572 A | 3/2008 | |
| KR | 20020004164 A | 1/2002 | |
| KR | 101438704 B1 * | 5/2014 | ........ C01C 119/042 |
| KR | 101438704 B1 | 9/2014 | |
| WO | WO-2007074709 A1 * | 7/2007 | ............ E04H 9/023 |
| WO | WO-2007114072 A1 * | 10/2007 | ............ E04H 9/023 |
| WO | WO-2008096378 A1 * | 8/2008 | ............ E04H 9/023 |
| WO | WO-2009034585 A1 * | 3/2009 | ............ E04H 9/021 |
| WO | WO-2010000897 A1 * | 1/2010 | ............ E04H 9/023 |
| WO | WO-2014173622 A1 * | 10/2014 | ............ E01D 19/042 |
| WO | WO-2015133979 A1 * | 9/2015 | ............ E04H 9/023 |
| WO | WO-2015140214 A1 * | 9/2015 | ............ E04H 9/023 |
| WO | WO-2016137409 A1 * | 9/2016 | ............ E04H 9/021 |
| WO | WO-2019029197 A1 * | 2/2019 | ............ E01D 19/04 |

\* cited by examiner

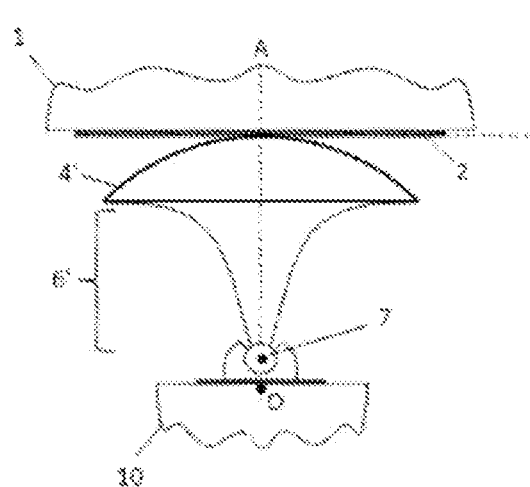
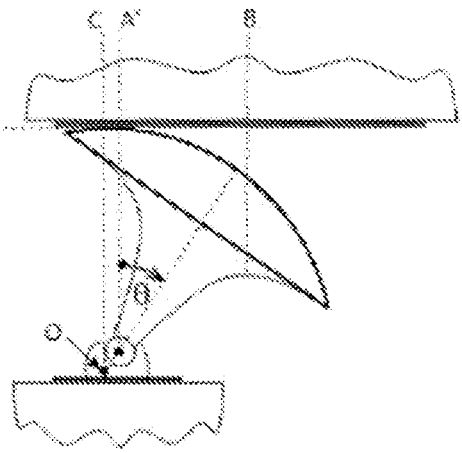
Fig. 1A                     Fig. 1B
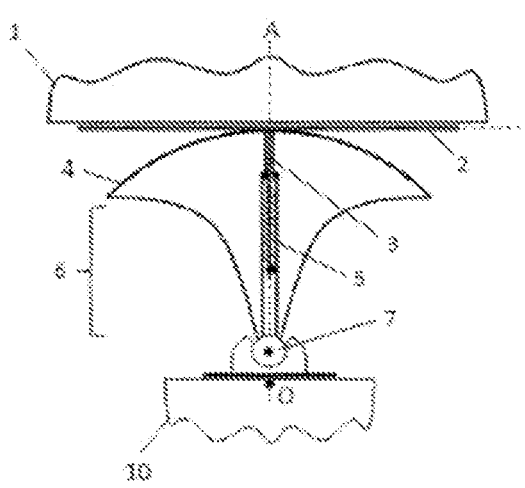
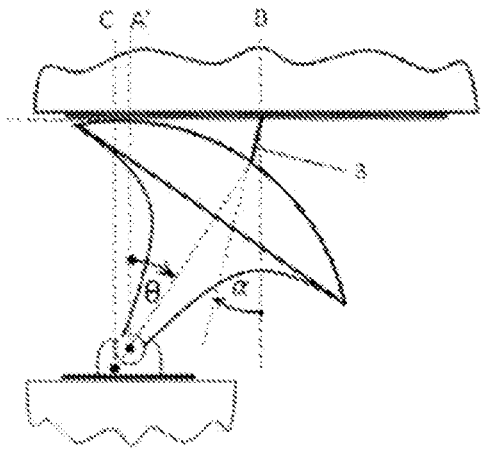
Fig. 2A                     Fig. 2B

KINEMATIC SEISMIC ISOLATION DEVICE

CROSS REFERENCE TO RELATED APPLICATION

This Application is a 371 of PCT/IB2018/059935 filed on Dec. 12, 2018, which is incorporated herein by reference

FIELD OF THE INVENTION

The present invention is related to the construction and real estate industries, for the protection of all kinds of structures against anthropic or natural vibrations such as earthquakes. In particular, the present invention is related to a kinematic seismic isolation device, or just isolator, which can be used in low or moderate rise buildings or weight structures related to said rises.

In the present technical the definition of low-rise buildings is buildings with a maximum rise of up to 40 meters, while moderate or medium-rise buildings are 40 meters to 125 meters tall, while high-rise buildings rise above 125 meters.

It is worth mentioning that these ranges are for the present application, but in the literature, said definitions may vary, where the definition of maximum height for low-rise buildings may have a ±10 meters variation, while the definition for high-rise buildings may have a variation of ±25 meters. In the same manner, the definition of moderate or medium-rise may have a variation of ±10 meters in the minimum height and its maximum height, may have a variation of ±25 meters.

STATE OF THE ART

The seismic isolation technology is one of the most effective ways to protect the structures, their inhabitants and content, from the effects of earthquakes. It is based on the decoupling of the system in the frequency domain, filtering the seismic input that the structure reaches, reducing its energy power. This is achieved by eliminating the rigid link that usually joins the structural system with the ground through the foundations, changing it for a horizontally interface much more flexible than the structural system to be protected. This interface divides the structural system in two parts, the superstructure is the part that is above said interface and substructure the one that is beneath. The seismic input affects the substructure directly and the superstructure indirectly, since to reach it, it must cross the flexible interface or isolating level. The seismic input is filtered or modified while crossing the isolation level, reducing the power of the earthquake for those frequency components that move away from the isolation frequency of the system. Only the components of the earthquake whose frequency content is close to the isolation frequency are able to reach the superstructure without being attenuated by the isolation interface. Given that the natural frequencies of the superstructure are distant (are much larger) to the frequency content of the seismic input that is able to affect it, the result is an attenuated structural response. The seismic response of the superstructure results in a combination of rigid body movement and attenuated vibrations.

The first type does not do damage and the second type of vibration generates small relative deformations in comparison with the ones that the structure would suffer without seismic isolation, therefore it is expected that its behavior will be linear elastic and without considerable damage.

Currently, seismic isolation systems can be grouped in three categories: 1) based on hyper-elastic materials, usually rubber, with hysteretic damping and/or added damping, 2) based on sliding with energy dissipation by friction, and 3) kinematic mechanisms that may include energy dissipation. The first kind of isolator is the most widely known and used in low and medium-rise, although there are known cases of implementation in high-rise buildings; however, their effectiveness and good performance are still debatable. The second kind of isolator is used only in low-rise structures, due to its design limitations. The third kind corresponds to the most novel and less known devices, with advantageous features over the previous two.

The use of elastomeric or rubber isolators presents two big technical limitations. The first one is that the lateral stiffness of the isolator decreases in the presence of an axial load, which can even lead to lateral instability. On the other hand, the tensile strength of rubber is very small compared with its compressive strength, being at least one order of magnitude smaller. These two limitations generate technical problems in the implementation of this kind of isolation devices in tall structures. This is due to the structures being taller and heavier, inducting instability in the isolators. Additionally, lateral loads generated by the earthquake induce the overturn of the structural system. The phenomenon produced by the tendency to overturn that is known as "rocking" is presented in FIG. 6A, and its effect could increase to a large degree the accelerations of the floor provoking structural damage, which causes vertical overloads in the isolators. These overloads not only greatly increase the compression, and thus the instability of the device, they can also eventually create traction between them, with the rupture of the rubber in the isolator. The latter represents a critical condition that could generate catastrophic failures in slender structures with seismic isolation.

Kinematic mechanisms that can include energy dissipation include friction pendulum or roller seismic isolation devices. These solve the lateral instability problem, but their tensile strength is null, being able to be implemented only in short and less slender buildings.

Belonging to this last group of devices, is the one shown in document KR 20020004164, referring to a directional friction pendulum seismic isolator. This isolator consists of a lower sliding plate, that forms a movement track in one direction; consisting also of an upper sliding plate, that is a movement track in the opposite direction: and a biaxial direction sliding piece between the upper and lower sliding plates, allowing for a pendulum motion. It also describes how the curvature of a sliding plate intervenes, to dampening the movement coming from an earthquake. We noted that two pairs of friction surfaces are required and all displacement in a different orientation to that of the sliding plates must be decomposed between them, the device being subjected to the corresponding force decomposition.

Document KR 101438704 refers to a vibration isolator with a conical friction surface. An upper sliding piece is presented that rests on an element with two adjacent friction surfaces, a first central surface with a spherical concave shape and a second surface with a conical concave shape located in the circumference of the first friction surface. This formation includes at least one upper and one lower surface (with two areas or surfaces with different concavity).

In JP 2008057572, a seismic isolator based on sliding is presented, in which, to reduce the working tension over an isolation layer an arc-shaped isolation structure is used, that allows motion between the lower and upper structure, therefore reducing the horizontal vibration. However, by promoting the motion of the upper structure along the arc, a spin of said upper structure is produced instead of a horizontal displacement, which leads to greater displacements in taller buildings.

Therefore, the present device addresses the two biggest problems related to the classic rubber isolators, that is, lateral instability and low tensile strength. The above mentioned with the purpose to extend the use of the basal isolation technology to taller buildings and/or more slender than in the present day. Besides of taking care of other observed problems in the state of the art such as the need of a force decomposition between sliding tracks, and the increase of displacements observed in isolators that pivot the structure from the base.

SUMMARY OF THE INVENTION

Responding to the present problem, an isolator or kinematic seismic isolation device, that uses the weight of a superstructure to stay erect, isolating the superstructure from the movement of a substructure or foundation. The device is shaped like an umbrella, is vertically stiff or rigid and able to rotate about its support point pivoting in the base, allowing for lateral displacement of the superstructure rolling on it. The device consists of a convex helmet piece (spheric in this particular case), located in the upper portion and an intermediate body that extends up to a bottom end, where it connects to, with freedom to oscillate, to the substructure or foundation. The convex part of the helmet piece is oriented upwards and above it rests a tread plate that secures to a bottom flat surface of the superstructure. In an essential aspect, the radius of curvature of the helmet is greater than or equal to the height of the device.

Because of its particular and versatile design, the present device allows using the very own weight of the building to generate restorative force and obtain the desired lateral stiffness and isolation frequency.

Furthermore, an additional horizontal restorative force to the one provided by the weight of the structure or as a substitute of said force, can be generated, by means of the inclusion of a traction element and a post-tensioning element inside the device, whose upper end crosses the helmet to fix the tread plate, for the purpose of keeping in contact the helmet and the tread plate. By providing lateral stiffness to the isolator by means of the post-tensioning element, said stiffness is not only indifferent to vertical overloads due to the earthquake, but it also provides the system the capacity to resist significant tensile levels, reducing the probability of collapse by overturn.

An embodiment of the present invention refers to a kinematic seismic isolation device for isolating a superstructure from the movement experienced by a substructure or foundation by providing an isolator with lateral stability and resistant to tension, comprising a rigid-structure helmet piece withe convex part of the helmet piece oriented upwards and a radius of curvature R; and an intermediate rigid-structure body, coupling to by its upper end to the underside part of the helmet piece and extending to a bottom end of the device where it connects via a pivoting connection means to the substructure or foundation; wherein, the radius of curvature R is greater than or equal to height H of the device, the height being defined with the device in vertical position as the distance between the apex of the helmet piece and the center of rotation of the pivoting connection means; and wherein a tread plate, that is secured to the bottom surface of the superstructure, rests on the helmet piece.

In a particular embodiment, the tread plate comprises a flexible tread sheet joined to the bottom surface of a rigid-structure plate.

In another particular embodiment, the tread sheet is constituted by a fiber reinforced elastomer, wherein the elastomer is made by natural or synthetic rubber or another carbon and hydrogen chain polymer that is highly elastic and deformable, and wherein the fibers for reinforcement are tension or traction resistant, such as steel fibers or carbon fibers.

In one embodiment, the plate is a flat plate of circular contour made of steel or another resilient and rigid material that allows load transfer and securing to the superstructure. Preferably, the bottom surface of the plate is flat.

Optionally, the intermediate body is hollow, defining an internal axial housing within itself.

Optionally, the intermediate body comprises an upper part and a bottom part that are coupled between them by treaded means.

In another embodiment, the kinematic seismic isolation device, according to any of the two preceding embodiments for the intermediate body, comprises a traction element joined in series with a post-tensioning element, wherein a bottom end of the traction element and the post-tensioning element are disposed in the internal axial housing of the intermediate body, wherein the post-tensioning element is secured by its free end to the inside of the intermediate body and the traction element passing through a hole that traverses the helmet piece axially and communicates with the internal axial housing, and the upper end of the traction element being secured to the plate.

With respect to the traction element, it is axially rigid and flexurally flexible, and the post-tensioning element is axially flexible and capable of resisting large deformations.

In a particular case, the traction element is a steel cable or other tension-resistant fibers twisted together.

In an embodiment, the post-tensioning element is a spring.

In another embodiment, the post-tensioning element is a pneumatic cylinder whose sleeve is integral with the intermediate body.

Optionally, the pivoting connection means comprises a ball joint, an upper track and a bottom track, wherein the ball joint has a treaded rod for joining with the intermediate body and the tracks are fixed to the substructure or foundation.

Additionally, the inside of the upper and bottom tracks is covered by a different material than that of its structure, having a known friction coefficient, determined by the requirements of energy dissipation according to the earthquake-resistant design.

Optionally, the radius of curvature of the helmet piece is variable in the horizontal direction about the vertical symmetry axis of the device.

BRIEF DESCRIPTION OF THE DRAWINGS

In the briefly described attached figures are included basic schemes, scale models with some degree of detail and, in general, examples of embodiments of the present invention without any intention of limitation.

FIG. 1A shows a scheme in front view of the isolation device.

FIG. 1B shows the device of FIG. 1A in an inclined position caused by the relative displacement of the superstructure with respect to the isolator base.

FIG. 2A shows a scheme in front view and cross section of an alternative embodiment of the isolating device that includes a traction element and a post-tensioning element inside.

FIG. 2B shows the device of FIG. 2A in an inclined position caused by the relative displacement of the superstructure with respect to the isolator base.

DETAILED DESCRIPTION OF THE INVENTION

Figure 3:
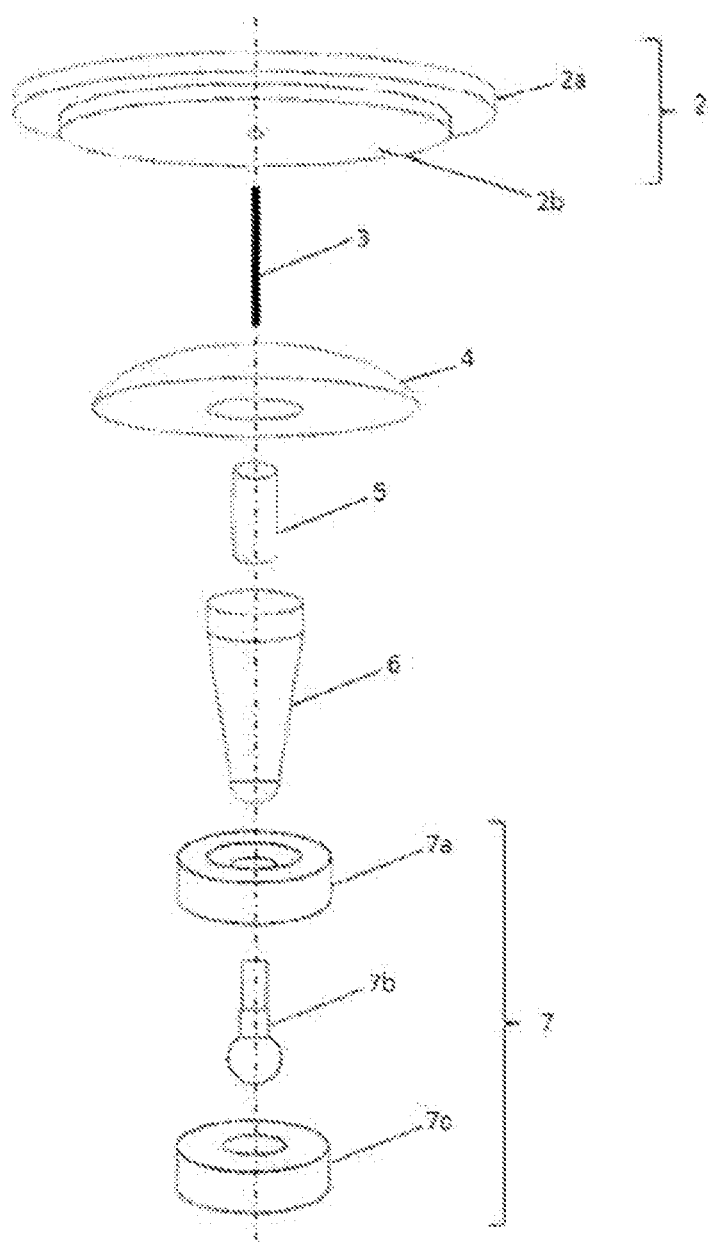
FIG. 3 shows a perspective and exploded view of an exemplary embodiment of the device in FIG. 2A.

In the following description the detail of the seismic isolation device is presented, aiming to solve the deficiencies of the current elastomeric devices, which are the most commonly used devices for seismic isolation of structures. Its operation is supported by the technical characterization model and the tests of concepts that show the effectiveness of the proposed device.

The seismic isolation device complies with the essential requirements of a seismic isolator, being those as follows:

a) It is vertically rigid to a large degree, specifically in compression (will not suffer from crushing or flattening). It is also very rigid in tension, as long as the post-tensing force of the traction element inside is not surpassed.

b) It possesses a low lateral stiffness, providing a lateral force as a function of lateral displacement, allowing this way to decouple the structure from the ground in the domain of frequency.

c) It is able to resist gravitational loads of the superstructure, as well as keep it in stable balance while in use.

Furthermore, partly or all of the lateral stiffness may be provided by the own weight of the seismically isolated structure. This is achieved by a particular design in which the pivot of the isolator is not contained in the action line of the weight of the building over it in its laterally deformed condition.

The principles or constitutive laws that lead to the theoretical characterization model of the present device, linking force with displacement are the following:

The isolation device is a rigid body, thus deformations are not considered and only spins about its pivoting point at the base.

The pivot resistance (resistive friction moment) is negligible, compared with the forces involved in the system, that is, the pivot is considered as a perfect ball joint.

The traction element and the post-tensioning element on the inside of the isolation device are considered as working in the linear elastic range. Non-linearities in the isolator are of the geometrical type, and caused by large displacements.

For the purpose of analysis, it is considered that the superstructure is in contact with the isolation device in a single point. This is because the contact area is small compared to the surface of the device.

It is considered that the friction on the contact surface of the convex helmet piece of the device with the treadplate secured to the superstructure allows rolling, thus displacement is not allowed.

The bottom surface of the tread plate, being in contact in its upper face with the superstructure and in its bottom face with the isolation device, is kept horizontal.

The mass of the device is considered as negligible compared to the mass of the superstructure that is being seismically isolated.

In terms of results, the following equation allows to obtain the force with which the device responds against the structure, $F_s$ (restorative force), by imposing a lateral displacement u, for the particular case of semi-spherical convex surface. Said force is non-linear in the lateral displacement variable u, and is described implicitly, given that $Au=Au(u)$, $a=a(u)$, $D/=D/(u)$, $0=0(u)$ and $w=w(u)$.

A1) eos (Q) $K_t$ $$F_s = \frac{P_e \cdot \Delta u + (H \cdot \sin(\alpha) - u) \cdot (\Delta l_0 + \Delta l) \cdot \cos(\theta) \cdot K_t}{(H + w)}$$

In the equation:

$P_e$, is the weight of the superstructure that befalls on the isolator;

Au, is the eccentricity of the weight load $P_e$ with respect to the pivot at the base, that is produced when R>H;

H, is the height of the device;

A, is the angle with respect to the vertical of the portion of the elastic element protruding from the spherical helmet piece.

DIo, is the initial post-tension elongation of the elastic element inside the isolator;

DI, is the elongation additional to the post-tension of the elastic element;

Q, is the turning angle of the device with respect to the vertical;

$K_t$, is the axial stiffness or rigidity of the post-tensioning element inside the isolator;

W, is the elevation of the superstructure produced when R>H.

From the analysis of the expression for $F_s$ the following is deducted:

By increasing the height H, the restorative force decreases.

By increasing the stiffness $K_t$, the restorative force increases.

By increasing the initial elongation $DI_0$, the restorative force increases.

By increasing the ratio between the radius of curvature R over H, Au increases and, therefore, the restorative force increases as well.

After a series of approximations and assumptions made considering the Chilean regulations for seismic design it is possible to obtain $F_s$ directly, by knowing the parameters $P_e$, H, p=R/H, $DI_0$, $K_t$ and the value of variable u.

$$F_s(u) = \frac{P_e(\beta-1)\left(1-\frac{\theta_{(u)}^2}{6}\right)\theta_{(u)} + \left(\frac{\theta_{(u)}}{\sqrt{9+\theta_{(u)}^2}} - \frac{u}{H}\right)\left(\Delta l_0 + \frac{\beta H \theta_{(u)}^2}{6}\sqrt{9+\theta_{(u)}^2}\right)\left(1-\frac{\theta_{(u)}^2}{2}\right)K_t}{1+\frac{\beta-1}{2}\theta_{(u)}^2}$$

Where the expression for the turning angle is:

$$\theta(t) \approx \frac{u(t)}{H}\left(1 - \frac{1}{5}\cdot(\beta-1)\cdot\frac{u(t)^2}{H^2}\right)$$

Figure 5:
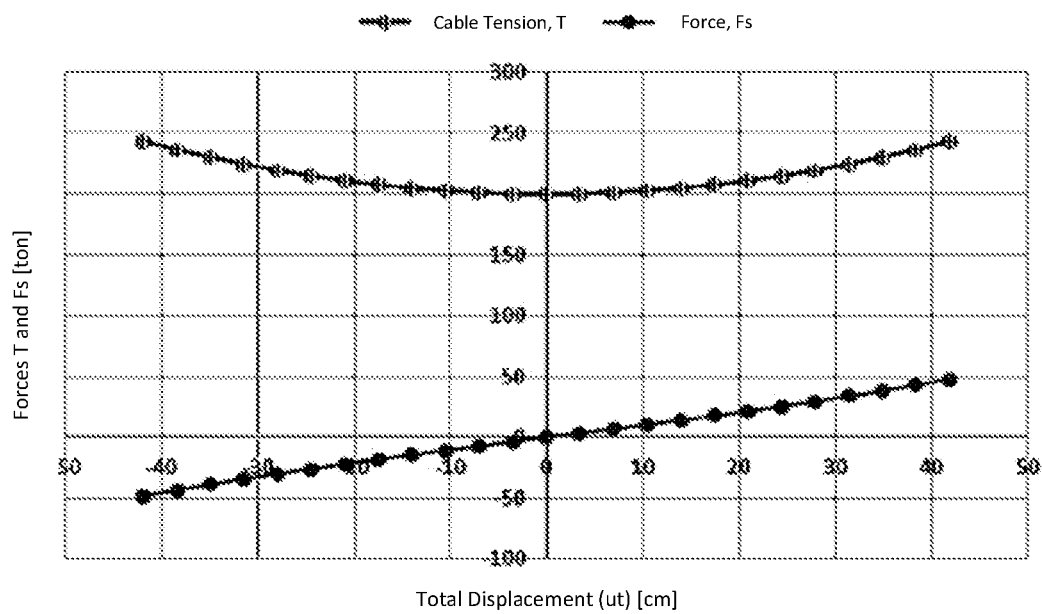
FIG. 5 shows a chart of the relationship of Force-Displacement and Tension-Displacement, for an embodiment of isolator.
Figures 6A, 6B:
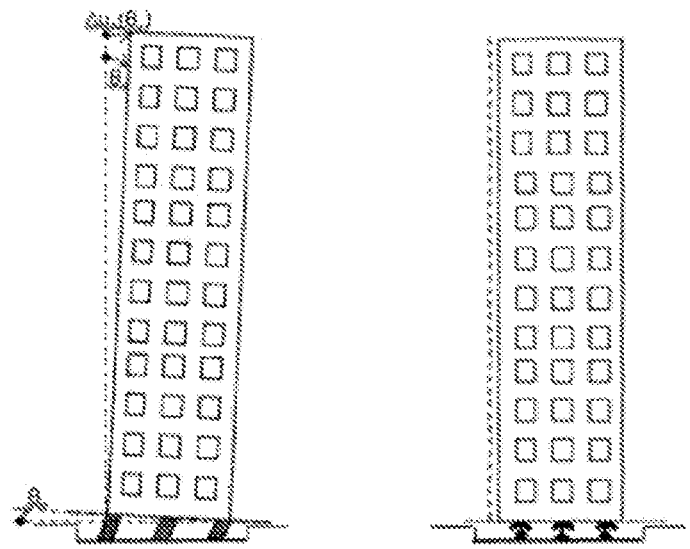
FIG. 6A shows the rotation or rocking of a building produced by an earthquake when state-of-the-art rubber isolators are used.
FIG. 6B shows a building with isolators of the presented technology.

In this way, the theoretical behavior of the seismic isolation device is described, as shown in the chart of FIG. 5, that shows the tension of the elastic element (3 together with 5) and the restorative Force, $F_s$, from particular parameters, in function of total displacement. From said figure, it can be appreciated that the tension of the traction element (3), for example, a cable, increases by imposing a greater displacement. Additionally it can be observed that the force $F_s$ is not a perfectly linear function of displacement, this because the geometric non-linearity, which makes said force to be non-linear, even though it is elastic.

In theory, when R=H, the lateral stiffness of the isolator is only provided by the tension of the elastic element (5) post-tensed inside. This is because the axial load does not influence in the response of the isolator when H=R.

When the parameter p=R/H takes values greater than 1 and the axial load Po is compressive, it helps to stabilize the isolator, that is, it provides positive equivalent lateral stiffness. If b>1 and load $P_e$ is tractive, this load reduces the lateral stiffness of the isolator, that is, it provides negative stiffness. Despite the above, the resultant lateral stiffness of a building with seismic isolation under compression and traction loads in its isolators is not altered by this means. This is because the stiffness increase of the overloaded isolators is the same as the decrease of stiffness of those unloaded axially, resulting in a null increment of the total lateral stiffness of the building. From the analysis it can be observed that values a little over 1 for b, increase substantially the lateral stiffness, for example, said effect can be appreciated for values between 1 and 1.1 for b.

In case of use, the corresponding elastic element (5) post-tensioned must be able to endure the initial post-tensioning elongation, plus the maximum probable additional elongation due to seismic action.

In FIG. 1A an embodiment of the seismic isolation device in equilibrium is schematically represented, maintaining a vertical position between a point of the tread plate (2) and a pivoting connection secured to a base or foundation (10). The axial axis of the device, in particular of the intermediate body (6'), is aligned with the segmented line A, traversing the apex of the helmet piece (4'), the rotation center of the pivoting connection means (7) and point O, that is the center of curvature of the helmet piece (4); condition that is met also when R=H and both last points are coincident. It is to be noted that, however in this example of embodiment the radius of curvature of the helmet piece is constant, in general, the helmet piece is convex and its radius of curvature may vary.

FIG. 1B shows the device of FIG. 1A tilted at an angle Q with respect to the vertical line A' due to a relative displacement of the superstructure (1) to the right relative to the base or foundation (10). In this way, the aligned part of the superstructure (1) with line A in FIG. 1A is displaced (by a distance "u") towards line B.

In this situation, the weight of the superstructure (1) acts on helmet piece (4') in a point (or a zone that includes a point) located on the helmet piece (4') that is vertically aligned with the center of curvature "O", that is, in the intersection of the surface of the helmet piece with the segmented line C, wherein, the distance between lines C and A' is Au.

FIGS. 2A, 2B, 3, 4A and 4B correspond to schematic representations of other embodiments of the invention and/or models for laboratory tests that have in common the possibility of incorporating the elastic element isolator, that is formed from a traction element (3) and a post-tensioning element (5).

In FIG. 2A the device is presented in a cross section to show the traction element (3) that may be, for example, a steel cable, and associated or in connection with it, a post-tensioning element (5) to apply the initial tension load to the traction element (3). Both are disposed in an axial housing having an upper exit by means of a hole (8) in the apex of the helmet piece (4), as seen in FIG. 4, in such a way that the traction element (3) traverses the hole in the helmet piece (4) and its secured to the tread plate (2).

In FIG. 2B, the tilted or displaced position of the device allows to appreciate a portion of the traction element (3) subjected to tension between the tread plate (2) and the apex of the helmet piece (4).

FIG. 3 corresponds to an exploded view depiction of the device, where the traction element (3) is shown between its securing point to the tread plate (2) and the helmet piece (4). Further below, the post-tensioning element (5) is shown outside the axial housing inside the device, between helmet piece (4) and the intermediate body (6). Further below the pivot or pivoting connection means (7) is depicted, including the upper and bottom pivot tracks (7a, 7c) and the ball joint (7b) that has a rod with securing means, for example, threads, for joining it with the bottom end of the intermediate body (6). The pivoting connection means allowing rotation in a spherical manner, in the same fashion as a ball joint, but with great load transmission capabilities. It is noteworthy that while developing the analytical equations of the mechanical behavior of the isolation device it has been considered as a hypothesis that the friction in the pivoting element (7) is negligible. Said hypothesis has not been experimentally verified yet. However, if friction is not negligible, it can easily be added to the equation of behavior of the isolator without the need for modifications of the elastic component described above.

Also with reference to FIG. 3, the tread plate (2) that is secured to the superstructure (1) and that can receive the upper end of the traction element (3) is formed by a rigid plate (2a) and a flexible tread sheet (2b). The first provides resistance for fixing to the superstructure (1), for the transmission of load to the helmet piece (4) and the material support for securing the traction element (3), and the second is an element that serves as an interface for the rolling or treading between the helmet piece (4) and the bottom surface of the plate (2a). The tread sheet (2b) may be in general, an elastomer such as natural rubber or synthetic or another polymer of carbon and hydrogen chains that is highly elastic and deformable, and to give it more resistance, it can incorporate a steel mesh fabric or another fiber, such as carbon fibers, that provides tensile strength in the plane of the sheet. The tread sheet (2b) is especially relevant since, without it, the load would be transmitted between two rigid elements generating crushing, scratching between the parts and rolling or treading would be difficult or impeded. This tread sheet is essential for the distribution of the contact load in a finite area, avoiding stress concentrations, in addition to allowing rolling or treading due to the friction coefficient with the elastomer of which it is formed.

Figure 4A:
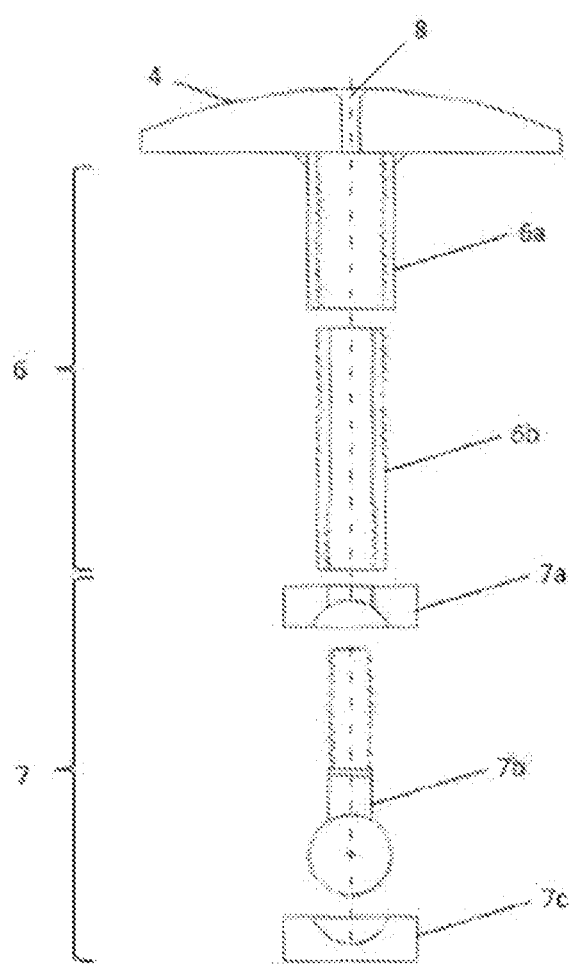
FIG. 4A shows a section and exploded view of another exemplary embodiment related to the device in FIG. 2A, corresponding to one of the scale test models.
Figure 4B:
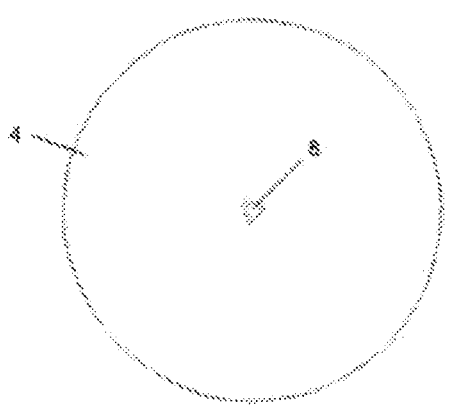
FIG. 4B shows a top view of the device of the preceding figure, showing the helmet piece with a center through hole.

FIGS. 4A and 4B correspond to an embodiment for laboratory tests, therefore the construction details do not correspond to any limitation.

In FIG. 4A the isolation device is presented in cross section, with a helmet piece (4), an intermediate body (6), comprising an upper part (6a) and a bottom part (6b) that are coupled to each other by threaded means which can facilitate the manufacture, transfer and installation of the device in construction site, separating it into an upper half that includes: tread plate (2), helmet piece (4), the upper part (6a) of the intermediate body and a bottom half that includes the bottom part (6b) of the intermediate body and the pivoting connection means (7). Furthermore, by means of this configuration of the intermediate body (6) it is possible to regulate the height of the device. The pivoting connection means (7) that is coupled to the bottom end of the intermediate body (6) is also presented. The top view in FIG. 4B is included to increase the clarity with respect to the hole (8) that passes through the helmet piece (4).

Now, referring in particular to the constituent elements of the invention, the plate (2a) is rigid, preferably circular in shape and can be made of steel or another material with great stiffness or if the superstructure is lightweight it could be possible to use some type of polymer, provided that it ensures the ability to resist the vertical load transmitted by the superstructure (1) to the helmet piece (4) of the isolator, according to the corresponding seismic design. Furthermore, the material of the plate (2a) must allow it to be adhered by vulcanization or another state-of-the-art method the tread sheet (2b). Plate (2a) is secured to the superstructure (1) on its upper face by means of appropriate connections or fixings to bear the transfer of shear loads, parallel to its plane, and axial loads, perpendicular to its plane. In its center it allows securing the traction element (3) so that it remains integral with the superstructure (1). The diameter and thickness of the plate (2a) are design parameters according to the requesting loads and the demand for displacement in the isolation system. As an example, its diameter is estimated to be around 100 cm.

The tread sheet (2b) has a hole in its center that allows the passage of the traction element (3) to secure it with the plate (2a), avoiding contact between the tread sheet (2b) and the traction element (3). As mentioned before, its function is to distribute the contact load with the helmet piece (4, 4'), reducing the concentration of tensions, in addition to facilitating the rolling between both. It can include a reinforcement of tensile-resistant fibers arranged in its interior in a direction parallel to its faces (horizontal direction), if required, according to the design requirements. Its thickness is a design parameter according to the requirements.

The traction element (3) is a flexible element in bending and shear, but axially rigid, with resistance to traction according to design loads. Its bottom end is housed inside the intermediate body (6) of the device and connects with the post-tensioning element (5). This post-tensioning element (5) has the function of generating the forces that make the tread sheet (2b) and the helmet piece (4) keep in contact. In this way, when the earthquake imposes a relative displacement between the tread plate (2) and the helmet piece (4), the traction element (3) elastically deforms the post-tensioning element (5), making both parts, the tread plate (2) and the helmet piece (4) tend to come together again. The above-mentioned has the effect of tending to achieve that the tread sheet (2b) and the helmet piece (4) keep together their respective holes through which the traction element (3) passes, minimizing the elongation that the latter imposes on the post-tensioning element (5).

All of this leads into a restoring effect equivalent to a lateral force, $F_s$, which makes the isolator regain its resting or vertical position.

The post-tensioning element (5) is axially flexible and exerts the post-tensioning load at the time of assembly. The post-tensioning load, the tensile strength and the axial stiffness of this element are determined according to the lateral stiffness required for the seismic isolation device together with the demand for traction requested in it, according to the seismic design. The post-tensioning element (5) at its upper end is attached to the traction element (3) and its bottom end is attached to the intermediate body (6). The elastic element, jointly composed of the traction element (3) and the post-tensioning element (5) apply an initial tension to prevent the superstructure (1) from lifting when subjected to a vertical earthquake and overturning seismic moment, along with providing restoring capability to lateral displacement or lateral stiffness.

The helmet piece (4, 4') is a rigid structure with a circular plan view and a convex upper surface and a symmetrical shape with respect to the vertical axis that passes through its midpoint. Its upper surface has a radius of curvature that may vary horizontally with respect to its axis of symmetry, this radius of curvature being greater than or equal to the height of the device. Said radius of curvature can be constant, as shown in the preferred configuration of FIGS. 1A, 1B, 2A and 2B. However, the radius of curvature may be variable, depending on the distance between a point on the helmet piece (4, 4') and the vertical axis of symmetry in the resting position. In said preferred configuration, near the axis of symmetry the radius of curvature tends to grow forming a plane, in such a way that this flatter zone allows for a better distribution of loads in static condition. Furthermore, said configuration favors the self-centering capacity of the isolation device, being able to recover its vertical position even when the magnitude of the lateral force due to dissipation by friction in the pivoting connection means (7) is not negligible or when it has additional hysteretic mechanisms for energy dissipation. The height of the device is defined in working condition, once the parts are assembled, as the distance between, the midpoint of the upper surface of the helmet piece (4, 4') and the center of rotation of the pivoting connection means (7). Its diameter in plant is determined according to the demand of maximum possible expected displacement in the seismic isolator. The dimension of the contact area between this element and the tread sheet (2b) must be taken into account when determining the aforementioned diameter, according to the design loads. That is, the diameter of the helmet piece (4) should not be less than twice the maximum possible lateral displacement, plus the diameter of the contact area between the helmet piece (4) and the tread plate (2b). A plant diameter of at least 75 cm is estimated in small structures, with little variation in relation to its size, being in general in the range of 75 cm to 130 cm in structures of a wide range of sizes, for example, buildings between 1 and 30 floors.

The intermediate body (6) is a rigid element of hollow or tubular geometry, which transmits the loads from the superstructure (1) to the substructure or foundation (10). The intermediate body (6) is connected inside to the post-tensioning element (5) by means of a removable joint, which can be a ball joint. While at its bottom end it is connected to the pivoting connection means (7), by which it is linked to the substructure (10). The intermediate body (6) must allow the housing of the post-tensioning element (5), both of which may eventually be a single indivisible element, such as, for example, a pneumatic cylinder that generates the elastic component, fulfilling the functions of both components at once. The dimensions and materiality of the intermediate body (6) are determined according to the maximum possible design loads. Furthermore, the shape of this constituent element of the isolator is restricted only by the functionality of the device. This element must only adequately transmit the loads from the convex surface of the helmet piece to the pivot, in addition to allowing housing the traction element (3) and post-tensioning element (5) inside, if these are required by design conditions. Considering the above, just as an example, the intermediate body can be cylindrical, column-shaped, inverted truncated cone or a combination of the above shapes, and in terms of its materiality it can be made of metal (steel, alloys, etc.), rigid polymers, among others.

The pivoting connection means (7) is an element composed of three assembly parts that constitute the ball joint for securing the seismic isolation device to the substructure or foundation (10). Rotational friction between the ball joint (7b), whose diameter is a design parameter, and the assembly formed by the upper track (7a) and the bottom track (7c) generates energy dissipation. The inside of the tracks (7a, 7c) of this element can be covered with a material different from its structure, such as Teflon, to control the friction coefficient between the surfaces in contact. The latter with the goal of that the capacity of energy dissipation by friction can be modified, according to design requirements. The diameter of the ball joint (7b) also allows to regulate the amount of energy dissipation, since the larger the diameter, there will be a greater the relative displacement between the surfaces and, therefore, the greater the energy dissipated.

Tests Performed

The isolator concept tests were carried out using 1:25 scale models in a 2-level building model with 1 meter height with a 50 cm×50 cm floor plan, using an isolator in each corner of the floor. The test model was subjected to vibrations with variable frequency in a wide range, always above the seismic isolation frequency. The shaking table used allows reaching the maximum frequency of 10 Hz (period of 0.1 s), with a range of motion of up to 25 cm, mobilizing a mass greater than 250 kg. The results clearly showed the effectiveness of the device in reducing the structural vibrations of the test model.

Subsequently, more elaborate tests were carried out, using three structural models that simulate 12, 18 and 24-story buildings. The test models were made at 1:25 scale, with plans of 40 cm×40 cm and heights of 120, 180 and 240 cm respectively, with 9 isolators on the plan in a regular grid every 20 cm.

The three building models were tested on a shaking table where they were subjected to 10 mm amplitude base vibrations (equivalent to 25 cm in real scale) and variable frequency. The three models with and without seismic isolation were tested, taking the latter case as a reference to determine the effectiveness of the technology used to reduce the vibrations of the superstructure. The results obtained show that in all cases there was a reduction in absolute floor accelerations when comparing the performance of the models with and without basal isolation, the reduction being up to 65%. Relative floor displacement reductions of similar relative magnitude were also recorded. In none of the tests, lifting was observed at the interface between the superstructure and the isolators, thus demonstrating the effectiveness of the proposed device in controlling the uplift and rotation (rocking) of the insulation level. Examples of the results of this research are shown in FIGS. 7 through 18. Therefore, it is experimentally demonstrated that the present device can be used in rectangular-shaped structures of at least up to 24 stories, with slenderness (height/width ratio of the base) of up to at least 6.

Figure 7A:
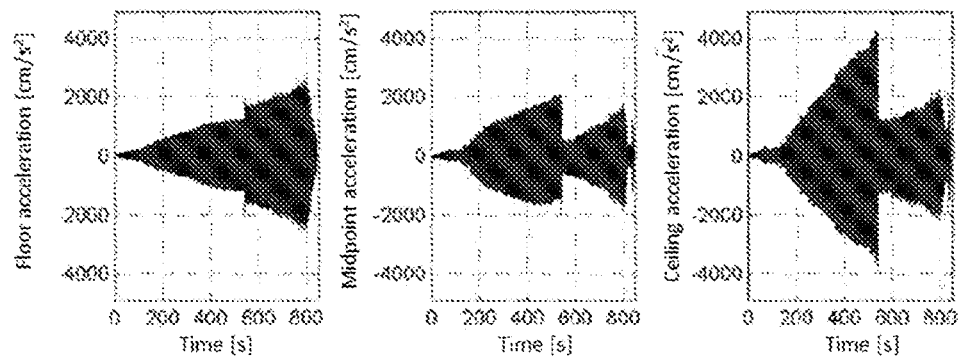
FIGS. 7A and 7B are, respectively, charts of accelerations and displacements as a function of time for the shaking table test of example 1—Without base isolation.
Figure 7B:
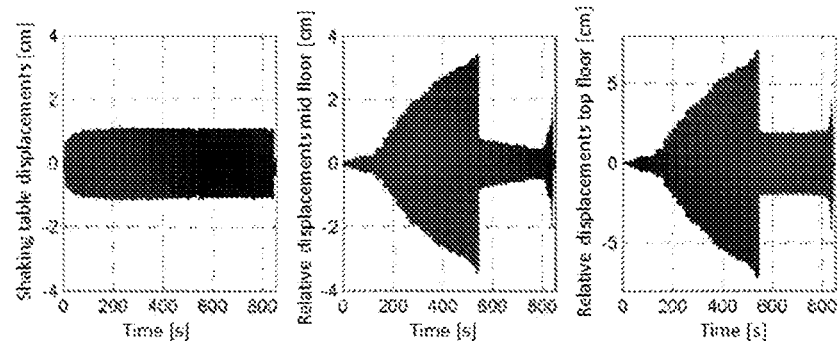
Figure 8A:
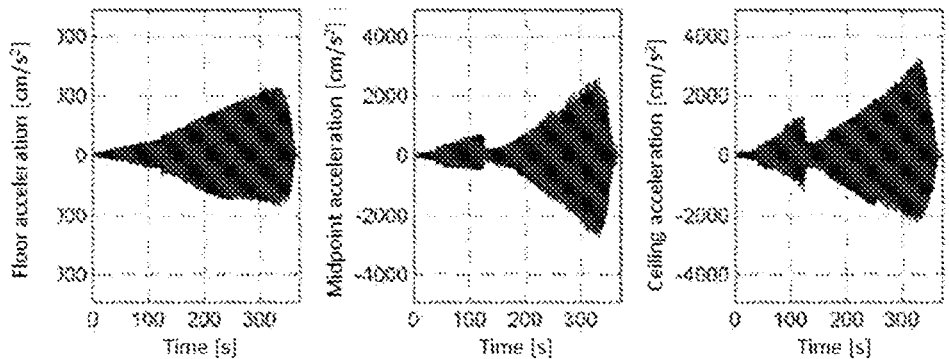
FIGS. 8A and 8B are, respectively, charts of accelerations and displacements as a function of time for the shaking table test of example 2—Without base isolation.
Figure 8B:
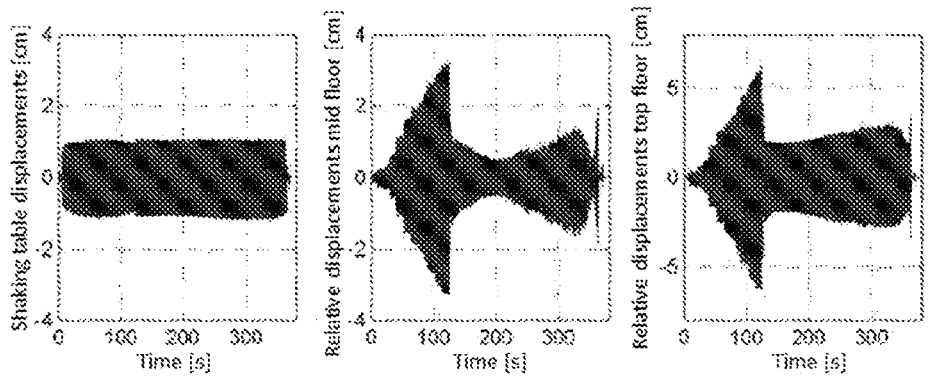
Figure 9A:
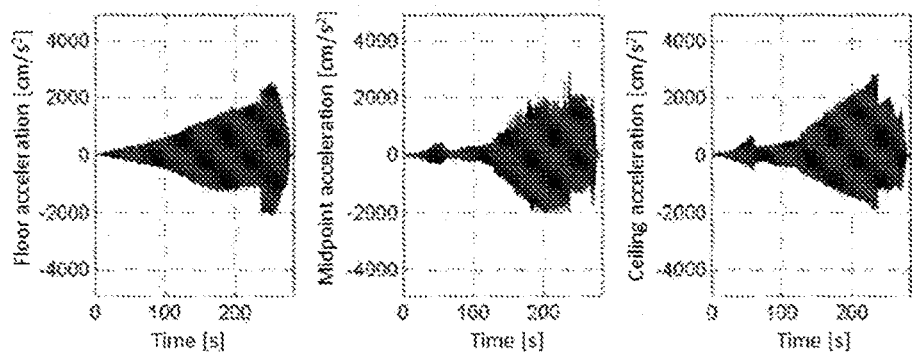
FIGS. 9A and 9B are, respectively, charts of accelerations and displacements as a function of time for the shaking table test of example 3—Without base isolation.
Figure 9B:
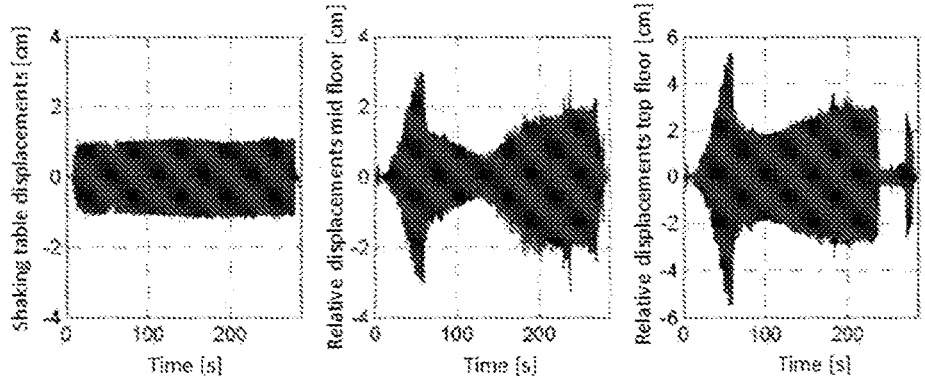

FIGS. 7A, 8A and 9A show the series of accelerations measured for the models without seismic isolation and in FIGS. 7B, 8B and 9B the corresponding floor displacements relative to a fixed inertial reference system. The sensors were located on the shaking table platform (which represents the ground in a real building), the middle floor and the top floor of the structure respectively, which is shown from left to right in the figures.

Figure 10A:
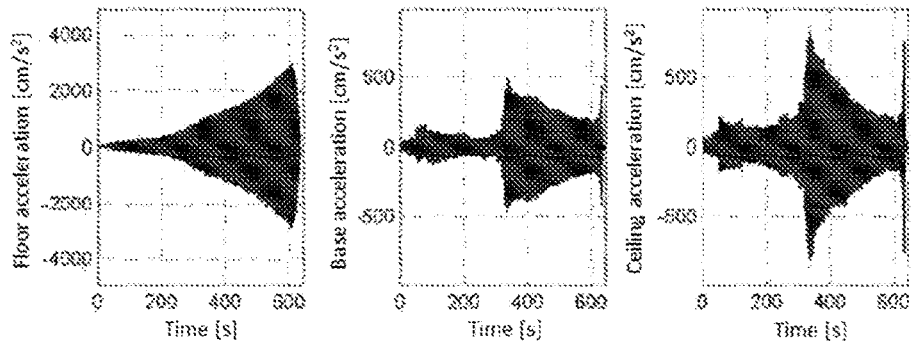
FIGS. 10A and 10B are, respectively, charts of accelerations and displacements as a function of time for the shaking table test of example 1—With base isolation.
Figure 10B:
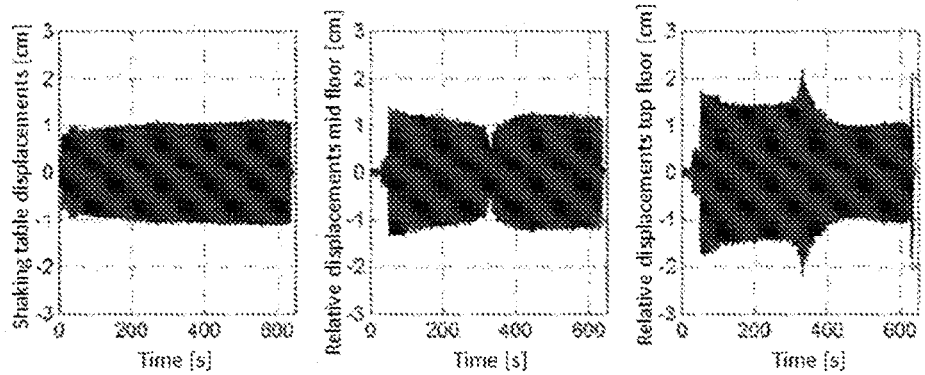
Figure 11A:
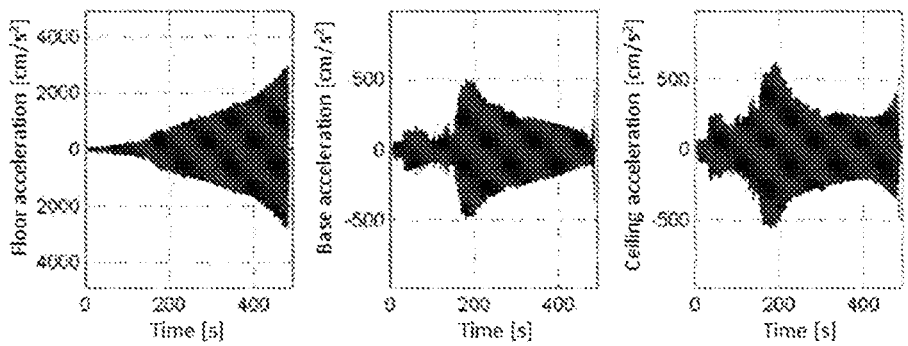
FIGS. 11A and 11B are, respectively, charts of accelerations and displacements as a function of time for the shaking table test of example 2—With base isolation.
Figure 11B:
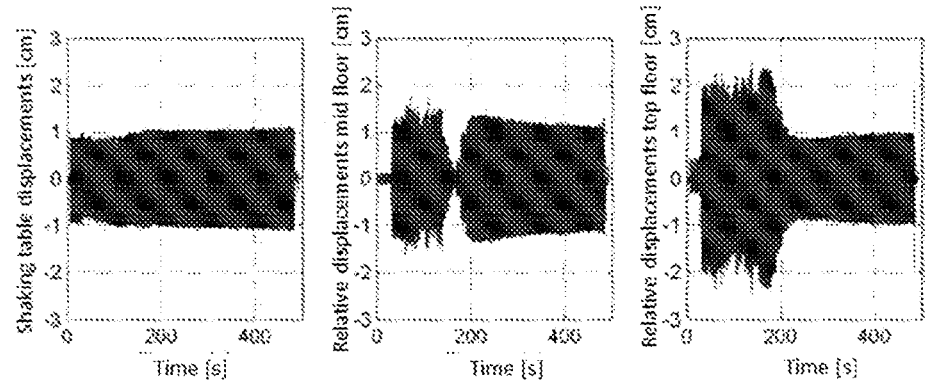
Figure 12A:
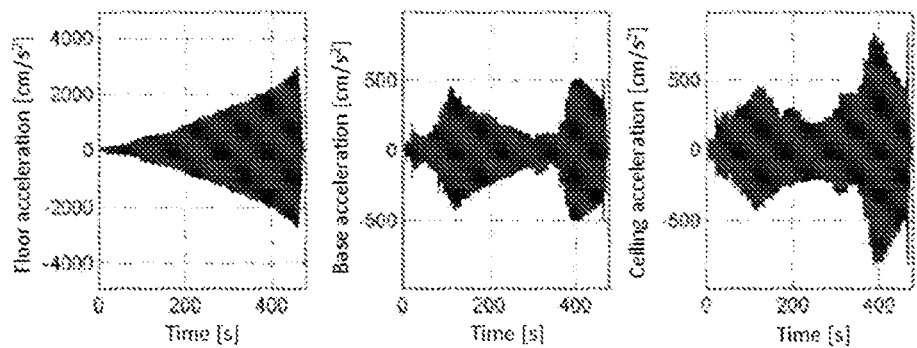
FIGS. 12A and 12B are, respectively, charts of accelerations and displacements as a function of time for the shaking table test of example 3—With base isolation.
Figure 12B:
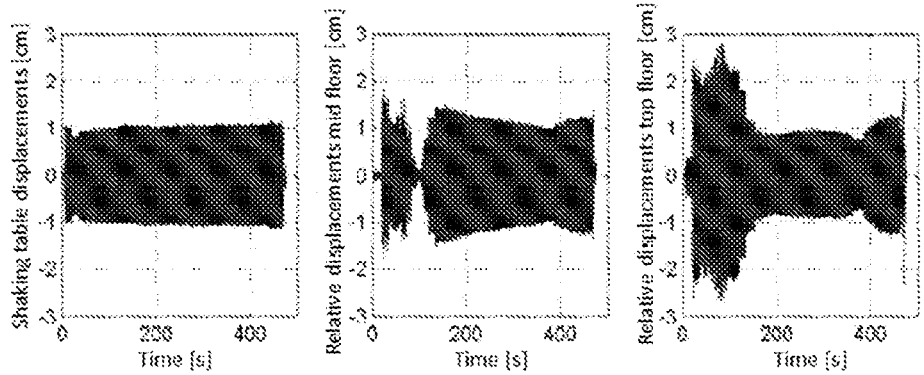

FIGS. 10A, 11A and 12A show the acceleration records for the seismically isolated models, and in FIGS. 10B, 11B and 12B the corresponding floor displacements relative to a fixed inertial reference system. The accelerometers that recorded these measurements were located on the platform of the shaking table, above the isolation level and on the top floor of the structure respectively, which is shown from left to right in the figures.

Regarding the time series versus acceleration shown in FIGS. 7A, 8A and 9A, corresponding to models with 12, 18 and 24 stories fixed at the base, versus FIGS. 10A, 11A and 12A, corresponding to the same 12, 18 and 24-story buildings, but with seismic isolation, it is possible to make a comparison of them with the purpose of quantifying the reduction of the response. To that end, the records obtained on the top floor of the structure were considered and it was identified through a comparative analysis that the proposed isolation system is capable of reducing floor accelerations. In the 12-story model, a reduction in absolute acceleration was recorded from approximately 40.4 to 7.8 $m/s^2$ (4.4 g to 0.8 g), corresponding to a reduction of approximately 82%; In the 18-story model, the reduction was from 32.4 to 6.9 $m/s^2$ (3.3 g to 0.7 g), being approximately 79%; finally, in the 24-story model, the acceleration was reduced from 26.5 to 8.8 $m/s^2$ (2.7 g to 0.9 g), being approximately 65%. That is, even in buildings of up to 24 floors and 6 slenderness, of the kind that is built in Chile as a residential building and offices, seismic isolation with the proposed device can present benefits in the reduction of acceleration of at least 67% in reduction of the response, effectively controlling uplift and rocking or rotation around the base.

Regarding floor displacements, when comparing FIG. 7B with 10B, corresponding to the representative model of a 12-story building fixed at the base and with seismic isolation respectively, a reduction in the relative ceiling displacement of 7 cm in the fixed building to 2.2 cm in the building with basal insulation is observed. Something similar occurs when comparing FIG. 8B with 11B, 18-story building models, where a reduction in the maximum relative ceiling displacement was recorded from 6.4 cm to 2.5 cm when incorporating seismic isolation. Minor, but still significant, was the reduction in relative displacements in the 24-story model, FIGS. 9B and 12B, where a reduction in ceiling displacement was observed from 5.4 cm to 2.8 cm. As expected, the maximum reduction occurred in the 12-story building, being approximately 69%. Although a reduction in the maximum relative ceiling displacement was observed as the height of the building model increased, reaching a reduction of 48% in the 24-story, 6 slenderness building model, this reduction is still significant.

Figure 13:
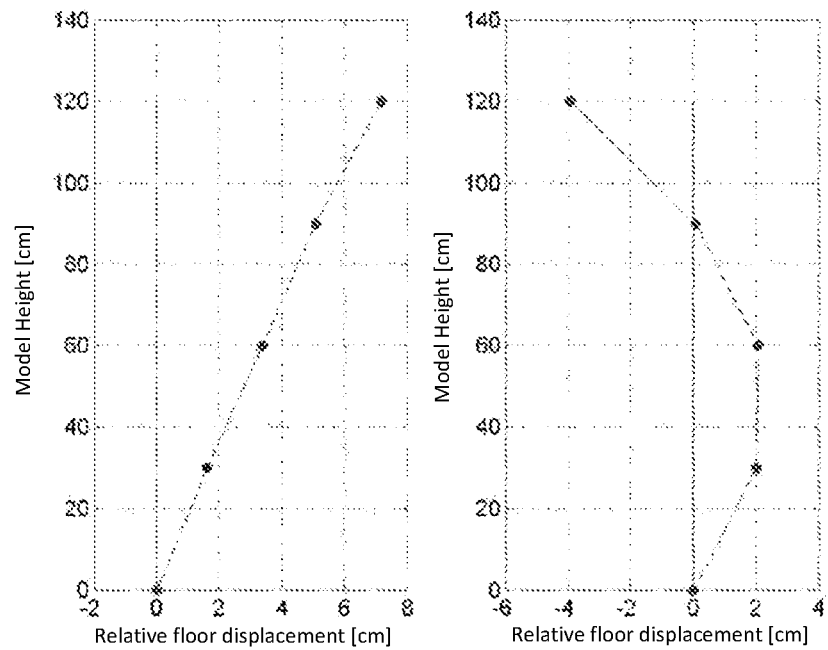
FIGS. 13, 14 and 15 show the first two modal forms calculated experimentally for models 1, 2 and 3 without base isolation, respectively.
Figure 14:
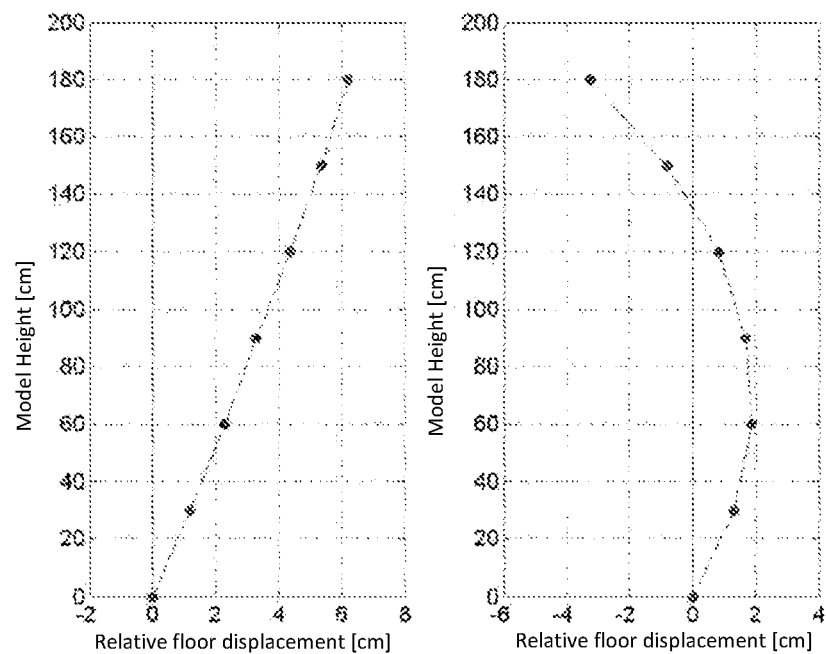
Figure 15:
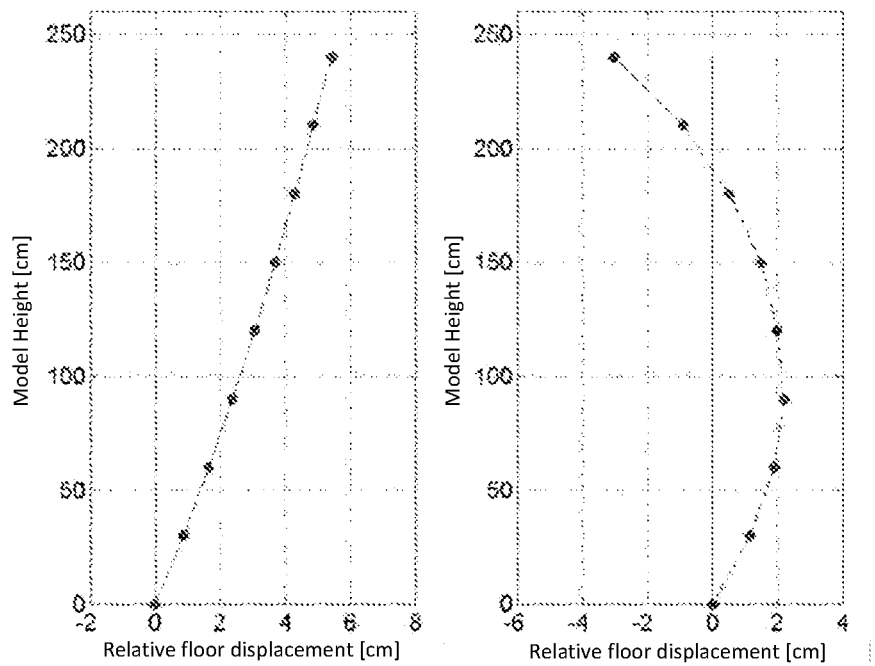
Figure 16:
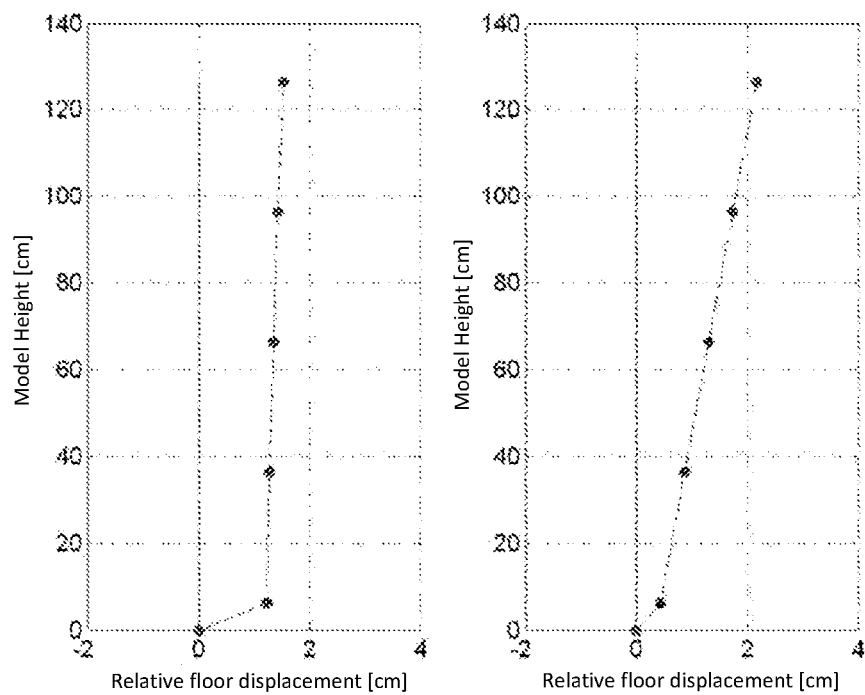
FIGS. 16, 17 and 18 show the first two modal forms calculated experimentally for models 1, 2 and 3 with base isolation, respectively.
Figure 17:
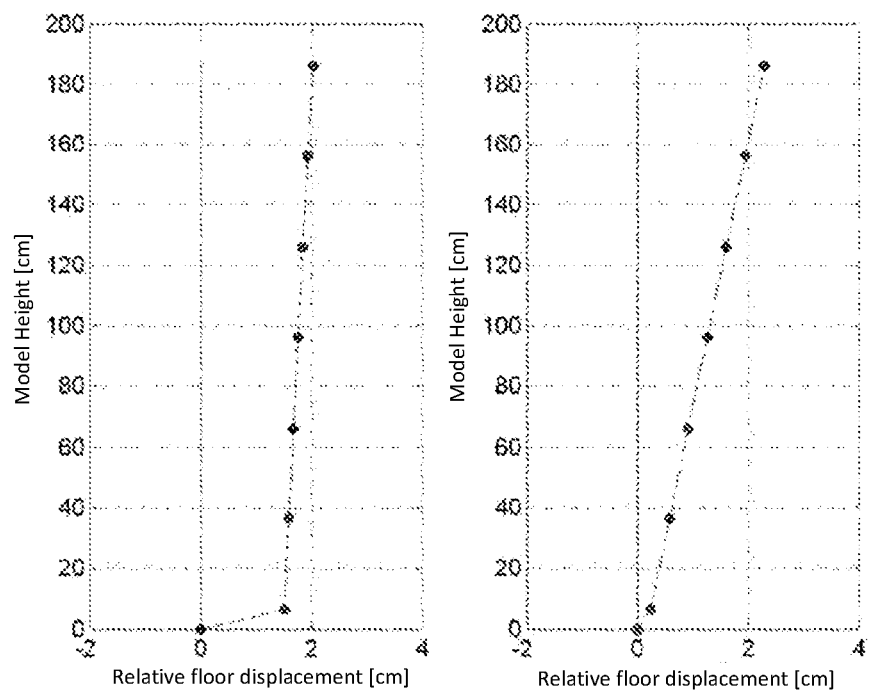
Figure 18:
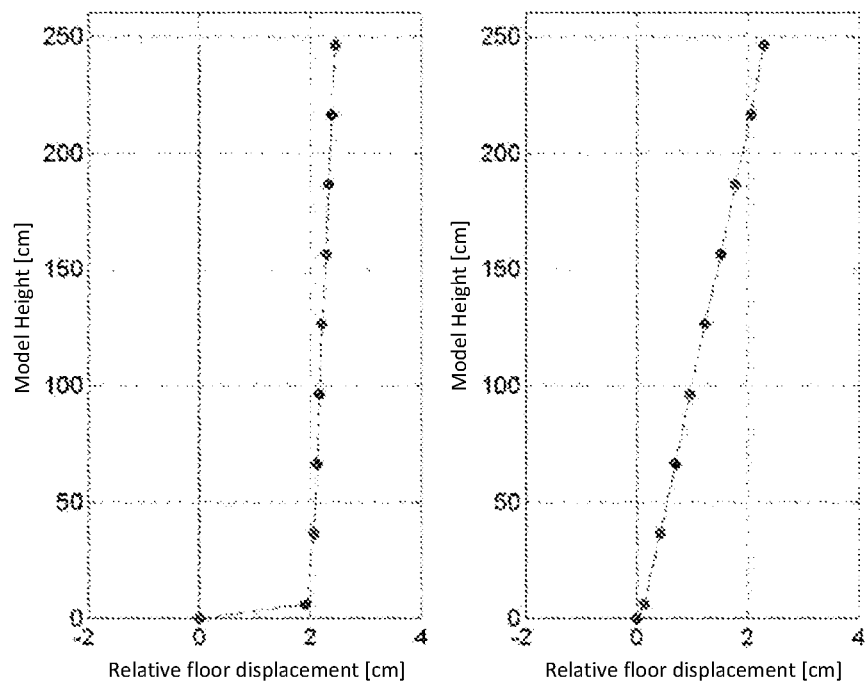

By analyzing the response of the structural models shown in FIGS. 7 to 12, using a Fourier transform of the time series obtained, it was possible to determine the natural frequencies of modes 1 and 2 associated with the superstructure without and with isolation. By filtering the time series around the frequencies of the first two modes, the corresponding modal forms of the structural models fixed at the base were determined, which are shown in FIGS. 13 to 15. The same was done for the structural models with basal isolation, which is shown in FIGS. 16 to 18. In these last figures, it is observed, particularly in the chart on the left, the predominance of the displacement of the isolation level in relation to the relative displacement of the upper floors with respect to the isolation level. This shows that the behavior of the superstructure is strongly influenced by rigid body movement, which does not impose loads or stresses on the superstructure, plus a much smaller portion of relative deformation of the superstructure, which is associated with internal stresses. All of the above accounts for the benefit of using the proposed isolation system in structures of at least up to 24 stories and 6 slenderness, to effectively reduce the response and internal stresses in the superstructure.

deformation of the structure of the latter, when the test model reached resonance, which may have altered the results.

The first mode of vibration of the structure with basal isolation, Ta in Table 1, corresponds to the isolation mode and corresponds to the one where the rigid body translation of the superstructure predominates. The Ti and h periods of the building with basal insulation correspond to higher modes where the contribution of the vibration of the superstructure is significant.

In model 1, the shortest, reductions in maximum ceiling displacements are observed from 7 cm to 2.2 cm, corresponding to a reduction of 69%.

In model 2, of moderate height, reductions in maximum ceiling displacements are observed from 6.4 cm to 2.5 cm, corresponding to a reduction of 61%.

In model 3, the tallest, reductions in maximum ceiling displacements are observed from 5.4 cm to 2.8 cm, corresponding to a reduction of 48%. In these three cases, reductions in the maximum relative ceiling displacements were recorded when incorporating basal insulation, these reductions being greater in less slender structural models. This is due to the greater decoupling achieved between the fundamental period of the fixed building and the period of isolation in model 1, as observed when comparing the quotient of said periods (Table 1), as well as the effect of the increase in the flexibility of the test models as their height grows.

In FIGS. 13, 14 and 15, the modes of vibration or modal forms for models fixed on the base are shown. On the left, mode 1 is shown and on the right, mode 2. The charts represent the buildings to scale, showing the relative floor displacements of each structure.

In FIGS. 16, 17 and 18, the modes of vibration for models with basal isolation are shown. On the left, mode 1 is shown (isolated mode) and on the right, mode 2. The charts represent the buildings to scale, showing the relative floor displacements of each structure plus the isolation system, whose height is 63 mm.

From the figures, it can be concluded that in a building with seismic isolation the deformation is concentrated in the isolation interface reducing the deformation demand in the superstructure. This favorably reduces the internal stresses

TABLE 1

Periods associated to each vibration mode.

| | Without Isolation | | | | With Isolation | | | |
| --- | --- | --- | --- | --- | --- | --- | --- | --- |
| | Obtained in free vibration | | Obtained in forced vibration | | Obtained in forced vibration | | | $n = \dfrac{Ta}{Tn}$ |
| Model | $T_1$ [s] | $T_2$ [s] | $T_1$ [s] | $T_2$ [s] | $T_a$ [s] | $T_1$ [s] | $T_2$ [s] | [adim.] |
| 1 | 0.240 | 0.075 | 0.305 | 0.173 | 0.710 | 0.247 | 0.190 | 2.96 |
| 2 | 0.505 | 0.153 | 0.505 | 0.188 | 0.825 | 0.557 | 0.201 | 1.63 |
| 3 | 0.660 | 0.216 | 0.570 | 0.210 | 1.180 | 0.772 | 0.359 | 1.79 |

Table 1 shows a summary of the results obtained for each test carried out on the scale models corresponding to 12, 18 and 24-story buildings with and without seismic isolation.

With respect to the tests carried out on the fixed structure at the base, it was possible to accurately identify the fundamental mode by means of free vibration tests. These last results were considered more reliable than those obtained in forced vibration since in these, slight lifts and small rotations were observed at the level of the shaking table, due to or forces developed in the superstructure, improving its structural behavior under seismic events.

LIST OF REFERENCES 1 superstructure
2 tread plate
2a rigid plate
2b tread sheet 3 traction element
4, 4' helmet piece
5 post-tensioning element
6 intermediate body
6a upper part (of the intermediate body)
6b bottom part (of the intermediate body)
7 pivoting connection means
7a upper track
7b ball joint
7c bottom track
8 hole
10 substructure, base or foundation The "elastic element" component referred to in the theoretical description corresponds to the assembly formed by the traction element (3) connected in series with the post-tensioning element (5).

The invention claimed is:

1. A kinematic seismic isolation device, to isolate a superstructure from the movement experienced by a substructure or foundation providing lateral stability and tensile strength, comprising:
a helmet piece of rigid structure with the convex part of the helmet piece oriented upwards and radius of curvature R; and
an intermediate body of rigid structure, which is coupled at its upper end to the underside part of the helmet piece and extending to a bottom end of the device where it is connected through a pivoting connection means to the substructure or foundation,
wherein, the radius of curvature R is greater than or equal to the height H of the device, the height defined with the device in a vertical position as the distance between the apex of the helmet piece and the center of rotation of the pivoting connection means; and
wherein, a tread plate, which is secured to the bottom surface of the superstructure, rests on the helmet piece.

2. The kinematic seismic isolation device, according to claim 1, wherein the tread plate comprises a flexible tread sheet attached to the bottom surface of a rigid structure plate.

3. The kinematic seismic isolation device, according to claim 2, wherein the tread sheet is made of elastomer reinforced with horizontally arranged fibers, wherein the elastomer is made of natural or synthetic rubber or other carbon and hydrogen chain polymer that is highly elastic and deformable, and wherein the fibers for reinforcement are resistant to traction, such as steel fibers or carbon fibers.

4. The kinematic seismic isolation device, according to claim 2, wherein the plate is a flat plate with a circular contour made of steel or other resistant and rigid material that allows the transfer of loads and securing to the superstructure.

5. The kinematic seismic isolation device, according to claim 2, wherein the lower surface of the plate is flat.

6. The kinematic seismic isolation device, according to claim 1, wherein the intermediate body is hollow, defining an internal axial housing thereof.

7. The kinematic seismic isolation device, according to claim 6, wherein the intermediate body comprises an upper part and a bottom part that are coupled to each other by threaded means.

8. The kinematic seismic isolation device, according to claim 6, comprising a traction element which is joined in series to a post-tensioning element wherein a bottom end of the traction element and the post-tensioning element are located in the internal axial housing of the intermediate body, wherein the post-tensioning element being attached by its free end to the inside of the intermediate body and the traction element passing through a hole that traverses the helmet piece axially and communicates with the internal axial housing, and the upper end of the traction element being attached to the plate.

9. The kinematic seismic isolation device, according to claim 8, wherein the traction element is axially rigid and flexurally flexible, and the post-tensioning element is axially flexible and capable of resisting large deformations.

10. The kinematic seismic isolation device, according to claim 9, wherein the traction element, is a steel cable or other tension-resistant fibers twisted together.

11. The kinematic seismic isolation device, according to claim 9, wherein the post-tensioning element is a spring.

12. The kinematic seismic isolation device, according to claim 9, wherein the post-tensioning element is a pneumatic cylinder whose sleeve is integral with the intermediate body.

13. The kinematic seismic isolation device, according to claim 1, wherein the pivoting connection means, comprises a ball joint, an upper track and a bottom track, wherein the ball joint has a treaded rod for joining with the intermediate body and the tracks are fixed to the substructure or foundation.

14. The kinematic seismic isolation device, according to claim 13, wherein the inside of the upper and bottom tracks is covered by a different material than that of its structure, having a known friction coefficient, determined by the requirements of energy dissipation according to the earthquake-resistant design.

15. The kinematic seismic isolation device, according to claim 1, wherein the radius of curvature of the helmet piece is variable in the horizontal direction about the vertical symmetry axis of the device.

* * * * *